Patented Feb. 16, 1943

2,311,534

UNITED STATES PATENT OFFICE 2,311,534

POLYESTER COMPOUNDS AND METHOD OF MAKING SAME

Anthony H. Gleason, Westfield, N. J., assignor to Standard Oil Development Company, a corporation of Delaware No Drawing. Application December 8, 1938, Serial No. 244,561

18 Claims. (Cl. 260—78)

This invention relates to polyester compounds and methods of producing and using same, and is a continuation in part of patent application Ser. No. 749,928, filed October 25, 1934, now Patent No. 2,147,647, issued Feb. 21, 1938.

Certain hydroxy acids possess the property of esterifying per se under the influence of heat and other agents to produce long chain products hereafter termed "polyesters." Such esterification reactions are, in general, promoted by heat and by catalysts such as strong acids, e. g. sulfuric acid. In most instances, however, strong acids of this type are objectionable due to the side reactions which are induced, giving rise to low molecular weight polymers of very dark color. In the case of 12-hydroxy stearic acid, for example, a secondary alcohol group is present which readily splits off forming water and an olefinic acid, especially if strong acid catalysts are employed, and these results generally prevent formation of polyesters having a molecular weight above 5,000 or 6,000.

Another objectionable feature in the esterification processes heretofore employed is the carrying out of the reaction in the presence of air. This also gives rise to oxidation side reactions which appear to produce considerable quantities of dark colored products.

Objects of this invention are to produce high molecular weight polyesters within a reasonable period of reaction time and to produce a light colored product suitable for many uses for which previous polyesters of this type were unsuited and to produce polyesters having a molecular weight of at least 10,000.

Further objects will be apparent from the subsequent discussion.

According to this invention, organic hydroxy acids, preferably those having more than 5 or 6 carbon atoms between the hydroxyl and carboxyl groups, are subjected to auto-esterification or condensation by the use of very effective catalysts and preferably carrying out the reaction in an inert or better still a reducing atmosphere. Depending upon the raw materials used, several types of polyesters may be obtained as indicated, for example, by the following formulas:

A 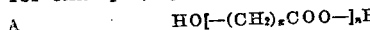

B 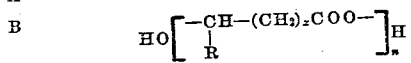

C 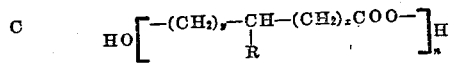

Polyesters of type A result from the auto-esterification of simple hydroxy acids containing a primary hydroxy group. Type B result when the hydroxyl group is present in a secondary position due to the presence of an organic side chain R being attached to the same carbon to which the hydroxyl group is attached. Type C is like A in having a primary hydroxyl group, but differs therefrom in having an organic side chain R. Types B and C are similar in that they each have a side chain but these side chains are in different positions. Where $x$ is 5 or less in Formula A and less than 5 in Formula B the tendency is toward the formation of lactones or lactides without much formation of high molecular weight esters. R may be any organic group, preferably hydrocarbon e. g. methyl, butyl, phenyl, etc. $n$ represents the degree of condensation or the number of units in the chain and can be determined up to a certain point by dividing the neutralization value of the original hydroxy acid by the neutralization value of the product.

A specific example of a suitable raw material for use according to this invention is 12-hydroxy stearic acid which has a molecular weight of 300 and a neutralization value of 187 and results in the formation of a polyester of type B in which $x$ is 10 and R is $C_6H_{13}$.

One of the main uses for this product is as a thickening agent for mineral, vegetable and other oils. Polyesters not only increase the viscosity of such oils when added in small proportions, but they also increase their viscosity index, i. e., their viscosity-temperature relationship, which characteristic is described in an article by E. W. Dean and G. H. B. Davis, "Viscosity variations of oils with temperature," from Chem. and Met., volume 36, pages 618–619 (October, 1929). For this reason it is necessary to prepare soluble polyesters for such uses. For this purpose polyesters of types such as B and C, having a side chain attached to one or more carbon atoms between the hydroxyl and carboxyl groups, are prepared, for instance, by the use of hydroxy acids having a secondary alcohol group. This is desirable because polyesters of type A produced from the so-called omega hydroxy acids while easier to prepare because of the stability of the primary alcohol group are inferior with regard to solubility in oils. Other groups such as halogens, alkoxy, phenyl, etc. may be present in the hydroxy acid molecule to be condensed. Other compounds may be used as raw materials. For example, oleic acid sulfated with sulfuric acid and hydrolyzed to produce a hydroxy stearic acid may be used.

Oxidized glycols, oxidized hydrocarbons, amino acids, and the like, may be also employed in many cases.

The invention, therefore, may be said to apply broadly to the auto-condensation of monocarboxylic acids containing a basic group and containing a hydrocarbon chain of preferably more than 5 carbon atoms between the basic group and the acid group, said hydrocarbon chain containing or not containing substituted groups in place of one or more of the hydrogens. Such acids may be represented by the following formula:

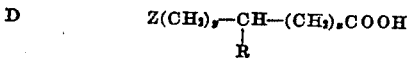

in which R may be either hydrogen or any organic group, preferably a hydrocarbon radical, either $x$ or $y$ may be 0 or any number provided $x+y=$ at least 5, and in which Z is a functional group capable of undergoing condensation with carboxyl groups, such as those groups having one replaceable hydrogen, as for example the hydroxy group, and in many cases, the amino and similar groups.

As catalysts, acids preferably organic ones having a dissociation constant greater than $.03 \times 10^{-3}$, such as chloracetic, dichloracetic, fumaric, phthalic and adipic acids, have been found to give better results than the strong mineral acids ordinarily employed for esterifications. The dicarboxylic acids especially, such as adipic, phthalic and fumaric acids, have been found to give exceptionally good results. It is preferable but not essential to maintain a 1:1 ratio of hydroxyl to carboxyl groups in the reaction mixture as by adding a glycol, such as octadecane 1:12 diol, glycols from cracked wax, etc., in an amount equivalent to the amount of catalytic acid used which is very small, generally in the neighborhood of 1%, although amounts as low as 0.01 or 0.1% or as high as 5% or more have been used successfully.

From a theoretical standpoint, any dry oxygen-free gas may serve as an inert atmosphere for the reaction but actually hydrogen has proved to give the best results, especially with regard to color of the final product. It has been found that moisture inhibits the condensation to a certain extent so that it is preferable to use a dehydrated medium for this purpose. It is also desirable to pass a dry inert gas, e. g. nitrogen, hydrogen, carbon dioxide and the like, through the reaction mixture to remove water formed by the condensation.

The temperature of esterification is generally between 180 to 220° C., although temperatures as low as 100° C. to 150° C. or as high as 250° C. may sometimes be employed. When the hydroxyl group present is in a secondary position, the temperature should not exceed 200° C., and for primary, 250° C. The time of heating may be from 30 to 100 hours although times of reaction of 10 hours or lower or even as high as 150 hours may be employed in many cases. A suitable solvent, preferably boiling above 200° C., may be used if desired, for example: kerosene, xylene, $SO_2$-extracts of hydrocarbon oils, di-chlorobenzene, etc. Subatmospheric or superatmospheric pressure may be employed to assist the esterification, and solid contact masses as such or coated with catalyst may be used advantageously. The product may be extracted by solvents such as higher ketones or alcohols, light hydrocarbons, chlorine compounds, ethers, sulfur dioxide, etc. and may be precipitated out from solution fractionally or all at once by methyl alcohol or other similar precipitant. The product may be milled or forced through an orifice or worked in gears or cracked to reduce the average molecular weight and give more stable viscosity in the blend.

The following experiment illustrates the results obtained heretofore.

Pure 12-hydroxy stearic acid is prepared by the hydrogenation and saponification of castor oil (subsequently freed from stearic acid by extraction with benzine), and heated in an inert atmosphere or in vacuo for several days at 200 to 220° C. with stirring. A dark viscous oil is obtained having the following properties:

| | |
|---|---|
| Viscosity Saybolt at 100° F | 50,690 |
| Viscosity Saybolt at 200° F | 3,250 |
| Viscosity index | 123 |
| Neutralization value | 15 mg. KOH/gm. |
| Molecular weight (approx.) | 3,500 |
| Iodine number | 6.8 cg. I/gm. |

Carbon dioxide was passed through the heated oil in order to facilitate removal of the water formed by condensation. In the above case, the time of heating was 144 hours and it was found that a longer time produced only a slight decrease in the neutralization value of the oil. The oil was decidedly off color and the iodine value gave evidence of either cracking or dehydration of the hydroxy acid to form olefinic acids. It will also be noted that the reaction period is exceptionally long and that higher molecular weights cannot be reached by this method.

*Example 1*

In contrast to the above test, an experiment was carried out according to this invention, in which 200 gm. of pure 12-hydroxy stearic acid was mixed with 2.5 gm. of adipic acid. The mixture was placed in a flat-bottomed wide-mouthed flask, fitted with a side arm at the neck and an inlet tube reaching to the bottom of the flask. The mixture was melted at 100 to 120° C. and a stirrer with a mercury seal for cutting off the air was attached. Dry hydrogen was bubbled through the melt at a rate of 5–6 liters per hour until the flask was thoroughly flushed out.

As soon as the air had been replaced, the mixture was heated to 185–190° C. with stirring and kept at that temperature for 72 hours. At the end of that time the mixture had become so viscous as to wind up on the stirrer. On cooling, the light colored product became tough and rubbery and was practically transparent in ⅛ inch layers. Its estimated molecular weight was about 14,000. Blends of this product were prepared with a Coastal oil and linseed oil, the results being as follows:

| | Coastal oil | +2% polyester |
|---|---|---|
| Viscosity at 100° F. (Saybolt) | 360 | 606 |
| Viscosity at 210° F. (Saybolt) | 50 | 70 |
| Viscosity Index (V. I.) | 38 | 98 |

| | Linseed oil | +2% polyester |
|---|---|---|
| Viscosity at 100° F | 139 | 238 |

It will be noted that the product not only raises the viscosity of oils in small concentrations but also improves greatly the viscosity index.

*Example 2*

An experiment was carried out similar to that shown in Example 1 but differing therefrom in the addition of 5 grams of octadecane 1:12 diol. A light colored product similar but somewhat superior to that obtained in Example 1 was produced.

Novel products prepared according to this invention are light colored, or colorless, plastic and elastic solids, and range in molecular weight from 10,000 to 40,000 or even more, and have an iodine number less than 5 cg. I/gm. and a neutralization value less than 10 mg. KOH/gm. They are exceptionally well suited as a lubricant or as a coating or impregnating material alone or in solution together with solvents and other compounding agents. They are also satisfactory as blending agents in fuels, lubricants including greases, paints, insulating oils, pulp oils, glycerides or other esters, textile oils, emulsions, soluble oils, as a compounding agent in plastics, resins, rubber, waxes, etc., and in conjunction with dyes, sludge dispersers, other thickeners, pour inhibitors, oxidation inhibitors, soaps, oiliness agents, extreme pressure lubricating agents, metallo-organic compounds, colloidal metals, graphite, and the like.

These polyesters possess oxidation inhibiting properties, especially in low concentrations as, for example, 0.01 to 0.1%. They also act as sludge dispersers in lubricating oils in concentrations of 0.1 to 1.0% or higher. They may be used as blending agents in concentrations of 0.01 to 1% to 5% to 30% or 50% or more, if desired.

It is not intended that the invention be limited to the certain specific embodiments shown but in the appended claims it is intended to claim all inherent novelty in the invention as broadly as the prior art permits.

I claim:

1. The process of making high molecular weight polyesters which comprises essentially subjecting to auto-esterification, at a temperature between the approximate limits of 100° C. and 200° C., in the presence of an organic acid catalyst, mono-carboxylic organic acids having the general formula

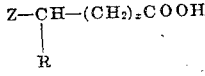

in which R is a hydrocarbon radical selected from the group consisting of alkyl and phenyl radicals, $x$ is at least 5, and Z is a functional group capable of undergoing condensation with a carboxyl group and is selected from the class consisting of hydroxyl and amino groups, said esterification being carried out in the absence of strong acids which tend to convert secondary hydroxy acids into olefinic acids.

2. Process according to claim 1 in which Z is a hydroxyl group and R is an alkyl group.

3. Process according to claim 1 in which the organic acid catalyst used is one having a dissociation constant greater than about $.03 \times 10^{-3}$.

4. The process of making high molecular weight polyesters which comprises subjecting mono-hydroxy mono-carboxylic fatty acids containing a secondary hydroxyl group and containing more than 5 carbon atoms between the hydroxyl and carboxyl groups, said hydroxyl and carboxyl groups constituting the only reactive groups in said fatty acids, to auto-esterification at a temperature between the approximate limits of 100° C. and 200° C., in the presence of .01% to 5% of a dicarboxylic acid catalyst having a dissociation constant greater than about $.03 \times 10^{-3}$.

5. Process according to claim 4 carried out in the presence of a small amount of a glycol approximately equivalent in amount to the organic acid catalyst used.

6. Process according to claim 4 carried out in a substantially non-oxidizing atmosphere.

7. Process according to claim 4, in which hydrogen is bubbled through the reaction mass during the auto-esterification.

8. The process of preparing high molecular weight polyesters which comprises subjecting mono-hydroxy mono-carboxylic fatty acids containing a secondary hydroxyl group and containing more than 5 carbon atoms between the hydroxyl and carboxyl groups, said hydroxyl and carboxyl groups constituting the only reactive groups in said fatty acids to autoesterification at a temperature between the approximate limits of 100° C. and 200° C. in the presence of a small amount of an organic acid catalyst having a dissociation constant greater than $.03 \times 10^{-3}$.

9. The process of preparing high molecular weight polyesters which comprises subjecting 12-hydroxy stearic acid to auto-condensation in the presence of a small amount of adipic acid at a temperature of about 135° to 190° C.

10. A light colored plastic rubbery condensation product having an iodine number less than about 5 cg. I/gm., a neutralization number less than about 10 mg. KOH/gm., a branched linear polymeric structure and having a molecular weight greater than about 10,000 and resulting from the auto-condensation of carboxylic acids having the general formula

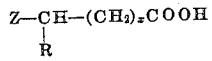

in which R is a hydrocarbon radical selected from the group consisting of alkyl and phenyl radicals, $x$ is at least 5, and Z is a functional group capable of undergoing condensation with a carboxyl group and is selected from the class consisting of hydroxyl and amino groups.

11. Product according to claim 10 resulting from the auto-condensation of an acid having the general formula

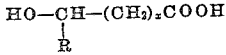

in which R is an alkyl group and $x$ is at least 5.

12. Product according to claim 10 soluble in mineral oils.

13. A light colored, rubbery polyester having an iodine number less than about 5 cg. I/gm., a neutralization number less than about 10 mg. KOH/gm., a branched linear polymeric structure and having a molecular weight of at least 10,000 produced by the auto-esterification of mono-hydroxy mono-carboxylic fatty acids containing a secondary hydroxyl group and containing more than 5 carbon atoms between the hydroxyl and carboxyl groups, said hydroxyl and carboxyl groups constituting the only reactive groups in said fatty acids, said polyester being soluble in liquid petroleum hydrocarbons, ketones, ethers, higher alcohols, chlorine compounds, and other solvents.

14. Product according to claim 13 having an iodine number less than 5 cg. I/gm. and a neutralization value less than 10 mg. KOH/gm.

15. A rubbery, oil-soluble polyester having an iodine number less than about 5 cg. I/gm., a neutralization number less than about 10 mg. KOH/gm., a branched linear polymeric structure and having a molecular weight of at least 10,000 and having the general formula

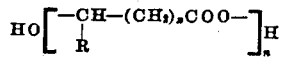

in which R is a hydrocarbon radical selected from the group consisting of alkyl and phenyl radicals, $x$ is at least 5, and $n$ represents the number of acid units polymerized in the chain, said polyester being derived by auto-condensation of a mono-hydroxy mono-carboxylic acid.

16. A light colored, rubbery polyester of 12-hydroxy stearic acid, soluble in mineral oils and having a molecular weight of at least 10,000, said polyester having an iodine number less than 5 cg. I/gm. and a neutralization number less than 10 mg. KOH/gm.

17. A light colored, tough, rubbery polyester of 12-hydroxy stearic acid having a molecular weight of at least about 14,000, said polyester being practically transparent in ⅛-inch layers and soluble in coastal mineral oil and in linseed oil, said polyester having an iodine number less than 5 cg. I/gm. and a neutralization number less than 10 mg. KOH/gm.

18. A light colored, rubbery condensation product having a molecular weight greater than about 10,000 and resulting from the auto-condensation of carboxylic acids having the general formula

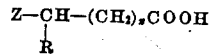

in which R is an alkyl radical, $x$ is at least 5, and Z is a functional group capable of undergoing condensation with a carboxyl group and is selected from the class consisting of hydroxyl and amino groups.

ANTHONY H. GLEASON.